United States Patent [19]

Graham et al.

[11] Patent Number: 4,458,401
[45] Date of Patent: Jul. 10, 1984

[54] SLEEVING METHOD AND APPARATUS

[75] Inventors: George W. Graham, North Kingstown, R.I.; Richard P. McCally, Mansfield, Mass.

[73] Assignee: Avon Products, Inc., New York, N.Y.

[21] Appl. No.: 290,065

[22] Filed: Aug. 4, 1981

[51] Int. Cl.³ .............................................. B21F 43/00
[52] U.S. Cl. .................................. 29/160.6; 29/718; 29/235; 221/233
[58] Field of Search ................. 29/235, 160.6, 450, 29/759, 718, 748, 754; 204/297 R; 221/233, 264, 278

[56] References Cited

U.S. PATENT DOCUMENTS

| | | | |
|---|---|---|---|
| 2,783,813 | 3/1957 | Duks | 29/235 |
| 4,074,424 | 2/1978 | Deshich et al. | 29/754 |
| 4,164,065 | 8/1979 | Funcik et al. | 29/754 |
| 4,278,184 | 7/1981 | Willis | 221/233 |

Primary Examiner—Daniel C. Crane
Assistant Examiner—David B. Jones

[57] ABSTRACT

An apparatus and method for securing a tubular member onto a post extending from the body of a jewelry piece supported at a work station wherein the member is positioned with its axis parallel to a preselected axis at the work station and, in response to the positioning of the member, the post is releasably engaged to align it with the first axis and wherein force is applied between the positioned member and the aligned post, thereby bringing the member into surrounding relationship with the post and causing the post to be released.

19 Claims, 7 Drawing Figures

SLEEVING METHOD AND APPARATUS

BACKGROUND OF THE INVENTION

This invention relates to the manufacture of jewelry and, in particular, to a method and apparatus for use in maintaining the integrity of jewelry parts during manufacture.

In the course of making a piece of jewelry, it is often required that certain elements of the initial piece have their integrity preserved during the subsequent manufacturing steps. In particular, certain types of jewelry such as, for example, earrings, have posts which, once attached to the jewelry body, must be preserved in their initial condition during one or more of the subsequent processing steps. Thus, in the case of earrings, the subsequent procedure of electroplating the earring body must be carried out so as not to substantially affect the previously attached earring post, thereby maintaining the post in a condition acceptable for use by the ultimate user.

Generally, in conventional practice, jewelry posts of this type have been protected by placing a rubber sleeve on the post after the post has been affixed to the jewelry body. This sleeving operation is typically performed by manual insertion of the post into the sleeve opening and, as a result, is extremely time consuming. Furthermore, in situations where the end of the sleeve is required to be a certain minimum height above the joint between the jewelry body and the post, the procedure becomes more tedious and consumes even greater amounts of time. As can be appreciated, if a more rapid and mechanized sleeving operation could be realized, a significant savings could be obtained in time and manpower.

It is an object of the present invention to provide an improved practice for inserting sleeves onto jewelry posts.

It is a further object of the present invention to provide an improved practice for inserting sleeves onto the posts of earrings to protect same during subsequent processing.

It is a further object of the present invention to provide a practice for inserting sleeves onto the posts of jewelry which is more rapid and requires less manpower than prior practices.

SUMMARY OF THE INVENTION

In accordance with the principles of the present invention, the above and other objectives are realized in an apparatus and method comprising means for bringing a sleeve into parallel relationship with a first axis and further means releasably engageable with a post extending from the body of a jewelry piece for substantially aligning the post with the first axis. Force producing means provides a relative force between the aligned post and sleeve, thereby bringing the sleeve into encompassing relationship with the post.

In the embodiment of the invention to be described hereinafter, the sleeve disposition means comprises an assembly having sleeve entry and exit ports and movable from a first position whereat a sleeve is entered into the entry port to a second position whereat a force is exerted on the sleeve in the entry port carrying same to the exit port whose axis is now aligned with the first axis. The releasably engaging alignment means, in turn, is mounted to the assembly so that it extends below the exit port and engages and aligns the post with the first axis when the assembly is in the second position. A force exerted on the sleeve with the assembly in the second position thus causes the sleeve to encompass the post while releasing the post from the alignment means.

BRIEF DESCRIPTION OF THE DRAWINGS

The above and other features and aspects of the present invention will become more apparent upon reading the following detailed description in conjunction with the accompanying drawings, in which.

DETAILED DESCRIPTION

Figure 1:
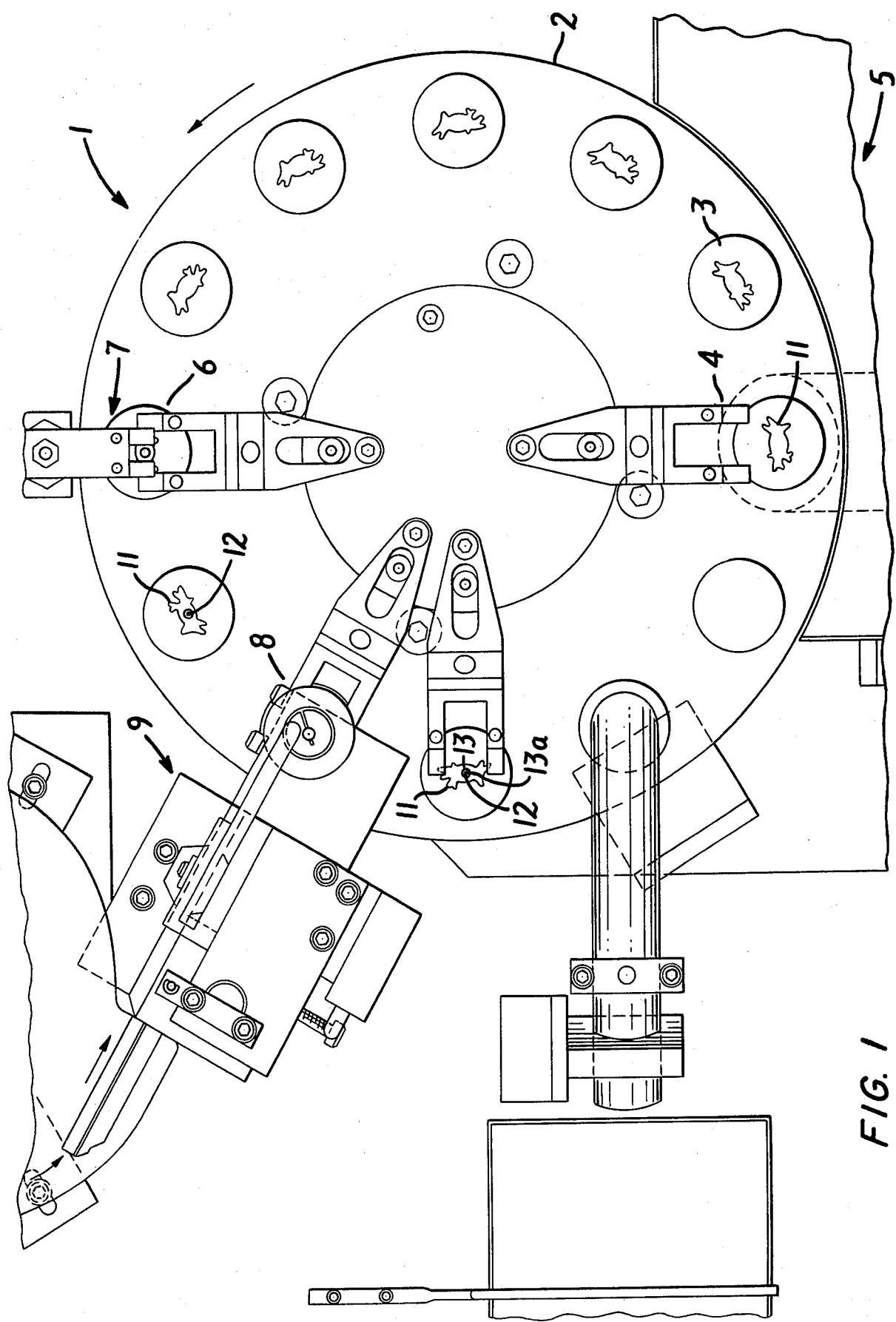
FIG. 1 illustrates in schematic fashion a system for handling jewelry employing a sleeving apparatus in accordance with the principles of the present invention.

In FIG. 1, a system 1 for forming a piece of jewelry and, in particular, an earring is shown schematically. A turntable 2 having support cradles 3 receives an earring body 11 at a first work station 4 from a supply 5. The turntable 2 carries the earring body 11 to a second work station 6 at which an earring post 12 is supplied and welded onto the body via supply and welding apparatus 7.

The earring body 11 with attached post is then carried to a third work station 8 at which a rubber sleeve 13 having an axial bore 13a is inserted over the post 12 by a sleeving apparatus 9 in accordance with the present invention. The sleeve 13 is required to protect the post 12 from the electroplating operation which is to be carried out on the earring body 11 in the subsequent processing of same. This prevents electroplating of the post 12 and the post is maintained in a condition acceptable for use of the earring by the ultimate consumer.

Figure 2:
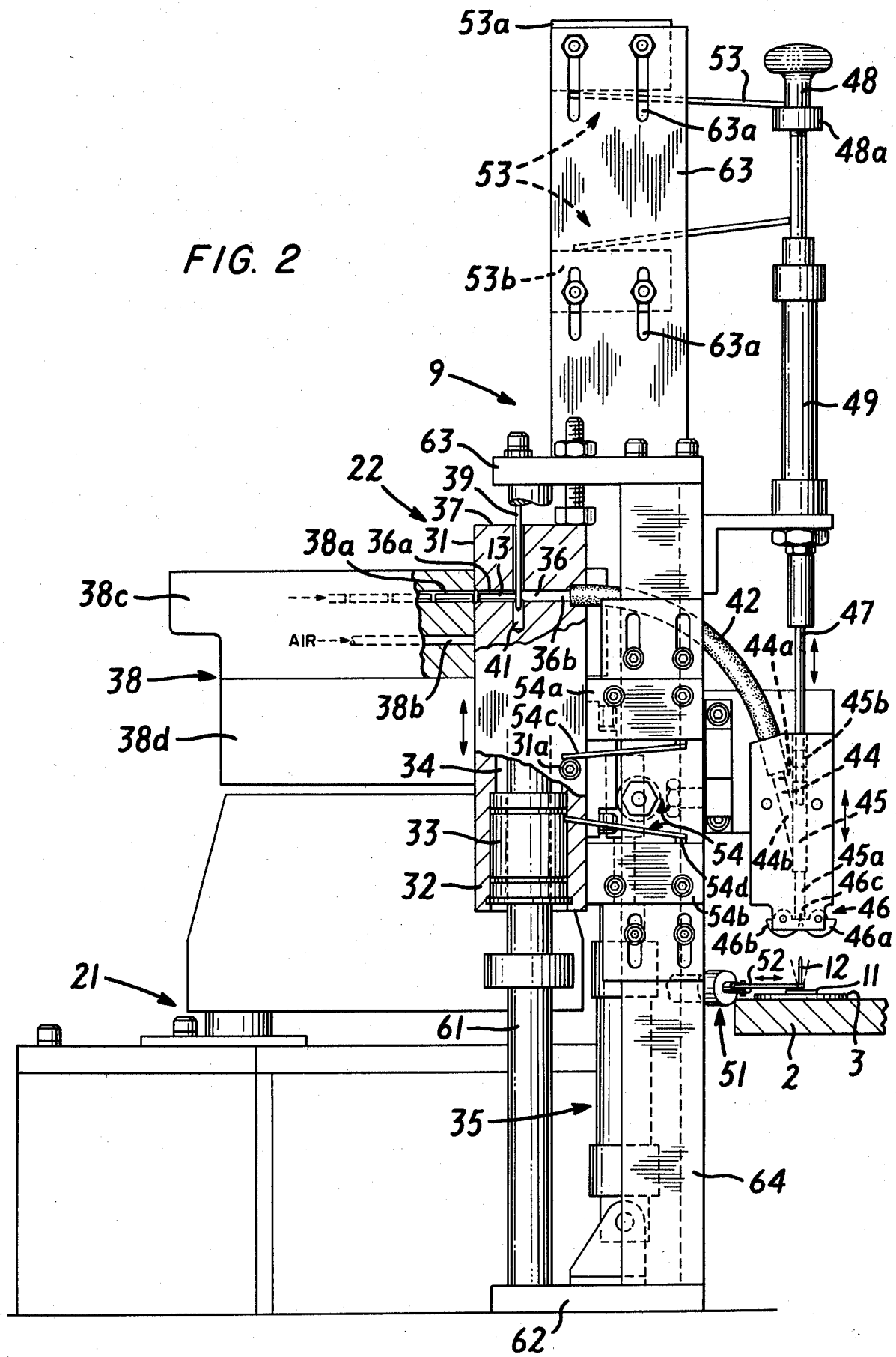
FIG. 2 illustrates a more detailed view of the sleeving apparatus of FIG. 1.
Figure 3:
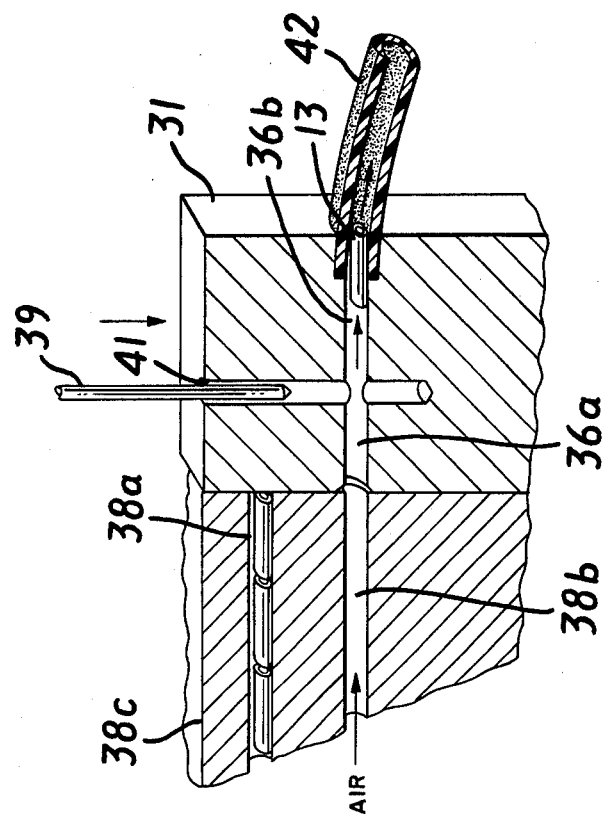
FIGS. 3–7 show schematically the sequence of steps for operation of the apparatus of FIG. 2.

In FIG. 2, the sleeving apparatus 9 of FIG. 1 is shown in greater detail. A frame 21 movably supports a sleeving assembly 22 which acts to deliver the sleeve 13 to the post 12 attached to the earring body 11. Assembly 22 comprises a sleeve entry block 31 carrying at its lower end 32 a bushing 33. The bushing 33 is slidably mounted to a guide rod 61 extending through a bore 34 in the block 31. Base plate 62 of frame 21 supports the rod 61.

A cylinder assembly 35 attached at one end to base plate 62 and at the other end to the entry block 31 provides a vertical actuating force to the block. This causes the block to slide on rod 61 between a first position whereat it receives the sleeve 13 and a second position whereat the sleeve is propelled from the block. More particularly, a horizontal through passage 36 having input and output ports 36a and 36b is provided at the entry block upper end 37. Port 36a abuts a sleeve delivery port 38a of a sleeve delivery and supply assembly 38 when the block 37 is in its first position. In the second position of the entry block 31, port 36a abuts an actuating force delivery port 38b of the assembly 38.

In the case shown in FIG. 2, the assembly 38 is in the form of a conventional vibratory bowl device having a vibratory base 38d which supports an upper bowl 38c. The bowl 38c has an inner ramp surface (not shown) at whose upper end is formed the port 38a by placing a cover (not shown) over the ramp end. The port 38b, in turn, is formed by a conduit (not shown) inserted through the bowl wall and acted on by a pneumatic supply (not shown) to provide the actuating force.

A pin 39 mounted to an upper plate 63 of the frame 21 extends into a bore 41 running transverse to the passage 36. The bore 41 crosses the passage 36 at a distance from the passage entry port 36a equal to the length of the sleeve 13. The pin 39 thus allows a single sleeve to be fed into the passage 36 when the delivery port 38b is aligned with same.

The exit port 36b of passage 36 feeds a connecting conduit 42 which leads to the entry port 44a of a passage 44 in a sleeve placement block 43. Block 43 is solidly fixed to the block 37 and moves from a disengaging position with respect to post 12 to an engaging position with respect thereto when the block 43 goes from its first to its second position.

The exit port 44b of passage 44 opens into a central passage 45 in the block 43 at a position in the central passage above the passage exit port 45a. Situated below the exit port 45a is a disengageable alignment assembly 46 which substantially aligns the post 12 with a preselected vertical axis corresponding to the vertical axis of the bore in the sleeve 13 when the sleeve is in the port 45a. In the case shown, the bore axis corresponds to the axis of passage 45.

The assembly 46 comprises two half-rollers 46a and 46b rotably mounted to the block 43 on opposite sides of the port 45a. These rollers are maintained under spring tension, causing the rollers to forceably abut at the nip 46c.

A push rod 47 extends through the entry port 45b of passage 45 and into the passage. This rod provides an actuating force for moving the sleeve 13 onto the post 12 when the block 43 is in post engaging position. A plunger 48 operates the rod 47 through a cylinder assembly 49.

The operating sequence of the sleeving apparatus 9 is illustrated schematically in FIGS. 3–7. Sleeves 13 are initially loaded into the bowl 38c and the vibratory base 38d actuated causing the sleeves to travel up the bowl ramp and line up in the bowl delivery port 38a. At this time, the sleeve delivery block 37 is in its first position, so that the entry port 36a aligns with the port 38a. A single sleeve, therefore, enters the port 36a owing to the presence of pin 39 in passage 41 (see, FIG. 3). At this point, the apparatus is ready for the sleeving operation.

Figure 4:
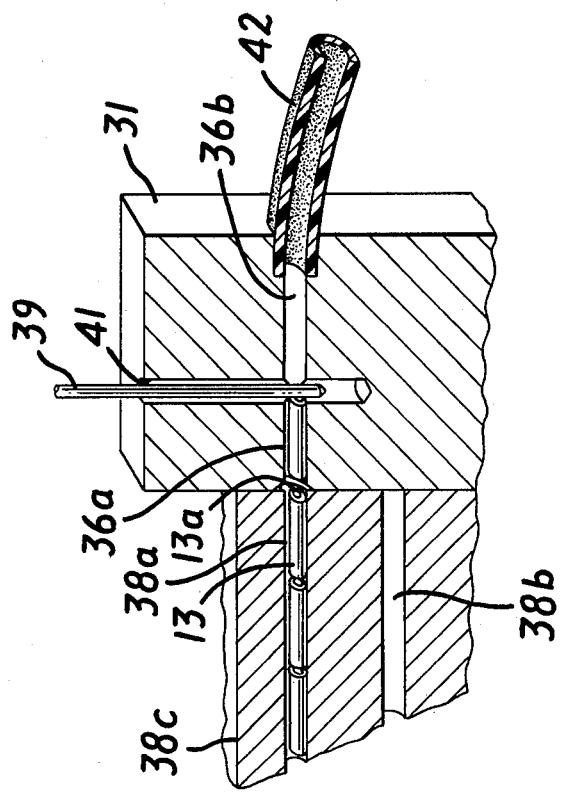
Figure 5:
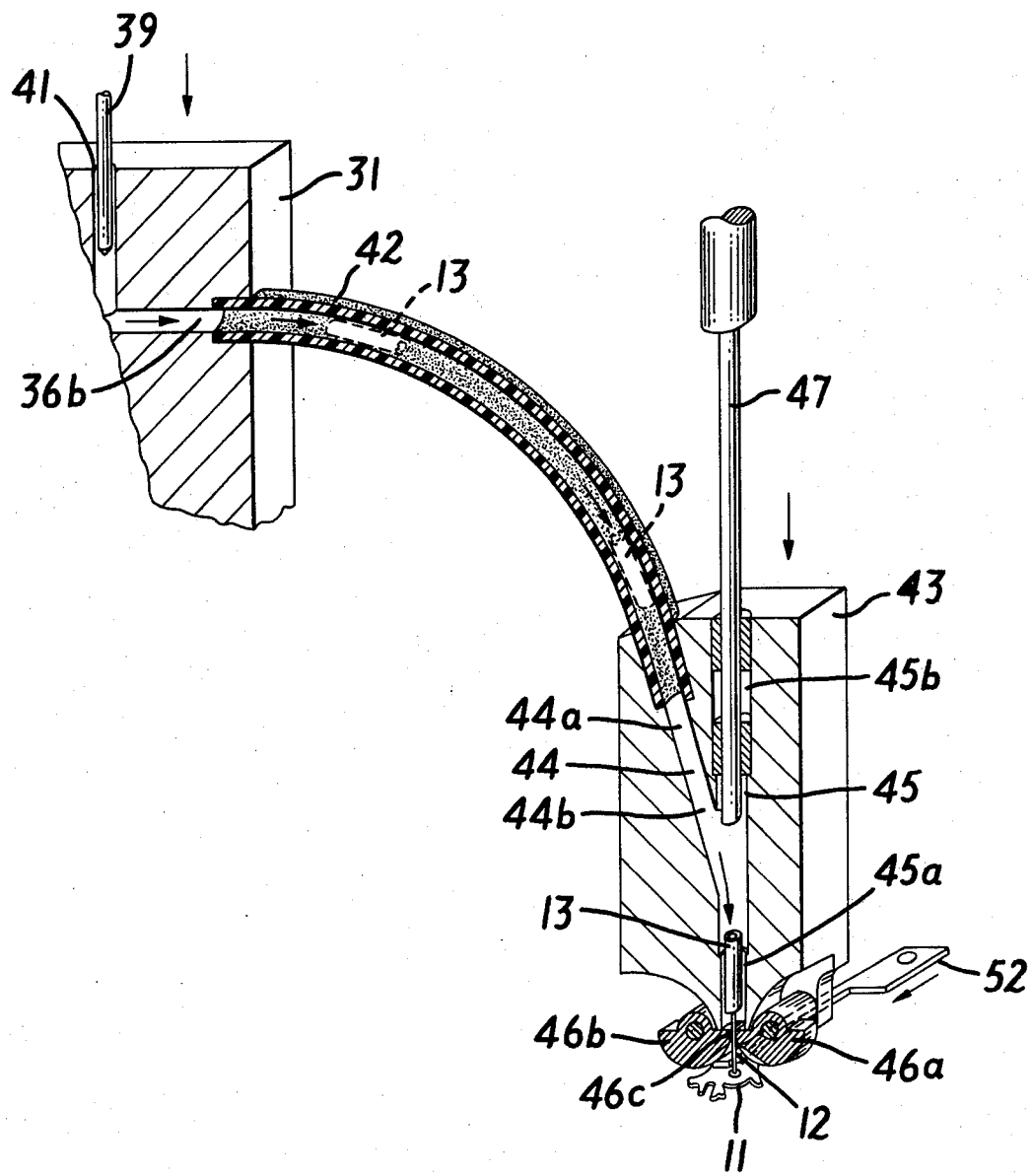
Figure 6:
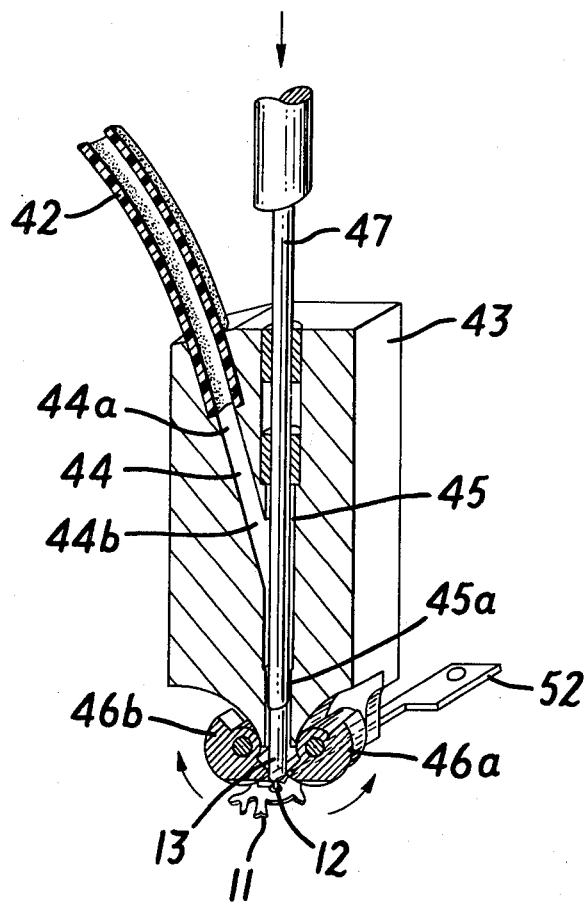
Figure 7:
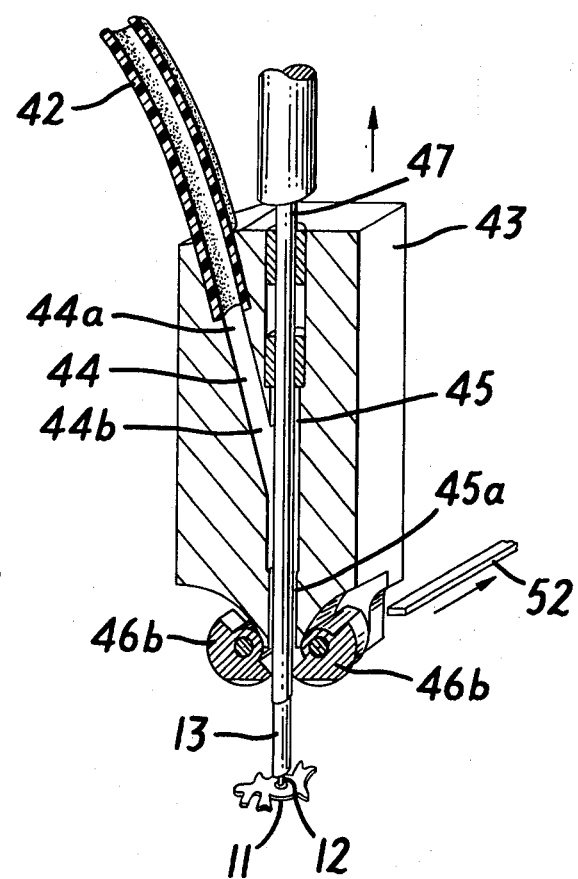

Once the jewelry body 11 and attached post 12 are brought to the sleeving station with the post 12 supported under the exit port 45a, the cylinder assembly 35 is actuated bringing the block 37 to its second position. In this position, as shown in FIG. 4, the port 36a now aligns with the port 38b and the pin 39, which is stationary, is left behind freeing the passage 36. The air jet supplied to the port 38a from the pneumatic supply is thus able to act on the sleeve 13 in the port 36a, thereby moving the sleeve through passage 36, conduit 42, passage 44 to the exit port 45a, as shown in FIG. 5.

Movement of the block 37 to its second position also causes the block 43 to move to its post engaging position whereat the rollers 46a and 46b engage the post 12 at the nip 46c. This engagement corrects any misalignment between the post and the passage 45 axis, thereby ensuring alignment of the sleeve bore and the post. At this point, therefore, the sleeve is at the exit port 45a and the post 12 is held by the rollers.

The push rod 47 is then actuated forcing the sleeve 13 against the rollers, whereby the post 12 is released therefrom and the sleeve is pushed over the post. (See, FIG. 6). With the sleeve now encompassing the post and the rod 47 actuated, the blocks 17 and 43 are brought back to their initial positions. The rollers 36a and 36b, in turn, slide over the sleeve and come to rest on the bottom end of rod 47 (see, FIG. 7). The rod 47 is then drawn back returning the assembly 22 to its initial position.

In the aforesaid sleeving operation, it is usually desired that the sleeve 13 not be pushed over the entire length of the post 12 and that a gap be left between the sleeve and the joint of the post and earring body. To this end, the apparatus 22 is also provided with a gap blade assembly 51 which introduces a gapping tool in the form of a gap blade 52 adjacent the post 12 prior to forcing the sleeve 13 over the entire post length. This tool prevents the sleeve from downward movement beyond the post position bordered by the tool so as to provide the desired gap.

To control the travel of the entry block 31 and the plunger 48, the apparatus 22 is further provided with adjustable contact assemblies 53 and 54, respectively. Assembly 53 comprises upper and lower plates 53a and 53b carrying contacts 53c and 53d which define the length of travel of the plunger 48 through contact with the upper plunger end 48a. Plates 53a and 53b are adjustably mounted in slots 63a of a rear vertical plate 63 mounted to the base plate 62 so as to enable adjustment of the length of travel.

A front plate 64 also mounted to base plate 62 adjustably supports in slots 64a upper and lower plates 54a and 54b of the assembly 54. These plates carry contacts 54c and 54d which define the length of travel of entry block 31 through contact with an abutment 31a. Adjustment of the plates 54a and 54b permits changing of this length of travel.

As can be appreciated, the sleeving apparatus of the invention is able to provide controlled sleeving of jewelry posts in an accurate and rapid fashion. Use of such apparatus thus promotes increased production and lowers costs, therefore, providing significant advantages.

In all cases, it is understood that the above-described arrangements are merely illustrative of the many possible specific embodiments which represent applications of the present invention. Numerous and varied other arrangements can readily be devised in accordance with the principles of the present invention without departing from the spirit and scope of the invention.

What is claimed is:

1. Apparatus for securing a tubular member onto a post extending from the body of a jewelry piece, said member being a sleeve having an axial opening parallel to the sleeve axis and said jewelry piece being supported at a work station, comprising:

means positioning said member sleeve with the axis and axial opening of said member sleeve parallel to a preselected first axis at said work station; , said sleeve positioning means comprising a sleeving assembly having a sleeve entry port and a sleeve exit port communicating with said entry port, said assembly being movable from a first position whereat said entry port is in sleeve receiving relationship to a source of sleeves and a second position whereat said entry port is adjacent a means for applying force to a sleeve therein and said exit port is aligned with said first axis, whereby in said second position the sleeve received in said entry port with said assembly in said first position is brought by said force from said entry port to said exit port with the axis of said sleeve aligned with said first axis;

means moving simultaneously with responsive to said positioning means and actuated in response to the movement of said sleeving assembly from said first to second positions releaseably engaging said post to align said post substantially along said first axis at said work station; and means applying a force between said positioned member and said aligned post, whereby said member is brought into surrounding relationship with said post and said releaseably engaging means disengages from said post.

2. Apparatus in accordance with claim 1 further comprising:

means for limiting the axial extent to which said member surrounds said post.

3. Apparatus in accordance with claim 2 wherein:

said limiting means includes gap blade means insertable adjacent said post to inhibit the relative travel between said member and post.

4. Apparatus in accordance with claim 1 wherein:

said releasably engaging alignment means is affixed to said assembly so as to extend below said exit port and to engage said post in said second position of said assembly.

5. Apparatus in accordance with claim 4 wherein:

said sleeving assembly includes:

a first housing, said first housing having a first through passage having first and second ports, said first port defining said sleeve entry port;

a second housing having a second through passage having third and fourth ports, said fourth port defining said sleeve exit port, said second housing further having a third passage having fifth and sixth ports, said sixth port opening into said second passage between said third and fourth ports;

and a conduit connecting said second and fifth ports.

6. Apparatus in accordance with claim 5 wherein:

said first housing further has a fourth passage crossing said first passage at a point spaced from said first port by a predetermined distance equal to the length of said sleeve;

and said apparatus further comprising a pin positioned to extend into said third passage to said crossing point for blocking said first passage when said assembly is in said first position.

7. Apparatus in accordance with claim 6 wherein:

said releasably engaging alignment means comprises first and second tension rollers rotably mounted such that the nip defined by said rollers is under said fourth port along said first axis.

8. Apparatus in accordance with claim 7 wherein:

said force applying means acts through said sixth port.

9. Apparatus in accordance with claim 8 wherein:

said force applying means includes a push rod for entering said sixth port and forcing said sleeve from said exit port onto said post.

10. Apparatus in accordance with claim 8 further comprising:

a source of supply of said sleeves, said source communicating with said entry port when said assembly is in said first position.

11. Apparatus in accordance with claim 10 wherein:

said sleeve supply comprises a vibratory bowl having an inclined inner surface at whose upper end is an exit aperture aligned with said entry port with said assembly in said first position.

12. Apparatus in accordance with claim 10 further comprising:

a further means for applying a force to said sleeve in said entry port at said second position of said assembly, whereby said sleeve is moved through said conduit and said second passage to said exit port.

13. Apparatus in accordance with claim 12 wherein:

said further means is a pneumatic means.

14. A method for securing a tubular member onto a post extending from the body of jewelry piece, said member being a sleeve having an axial opening parallel to the sleeve axis and said jewelry piece being supported at a work station, comprising:

positioning said member sleeve with the axis and axial opening of said member sleeve parallel to a preselected first axis at said work station, said positioning of said sleeve comprising moving a sleeving assembly having a sleeve entry port and a sleeve exit port communicating with said entry port, from a first position whereat said entry port is in sleeve receiving relationship to a source of sleeves and a second position whereat said entry port is adjacent a means for applying force to a sleeve therein and said exit port is aligned with said first axis, whereby in said second position the sleeve received in said entry port with said assembly in said first position is brought by said force from said entry port to said exit port with the axis of said sleeve aligned with said first axis;

as simultaneously with said member is being positioned and in response to movement of said sleeving assembly from said first to second positions, releaseably engaging said post to align said post substantially along said first axis at said work station; and applying a force between said positioned member and said aligned aligned post, whereby said member is brought into surrounding relationship with said post and engagement of said post is released.

15. A method in accordance with claim 14 further comprising:

limiting the axial extent to which said member surrounds said post.

16. A method in accordance with claim 15 wherein:

said step of limiting includes inserting a gap blade means adjacent said post to inhibit the relative travel between said member and post.

17. A method in accordance with claim 14 wherein:

releasable engaging of said post occurs in said second position of said assembly.

18. A method in accordance with claim 17 wherein:

said force is applied to said member with said assembly in said second position.

19. Apparatus in accordance with claim 18 wherein:

said method further includes moving said assembly from said second to said first position, while said force is applied to said member force.

* * * * *